Oct. 26, 1954

A. ETIENNE 2,692,484

SEPARATION OF GASEOUS MIXTURES

Filed April 4, 1951

Inventor
Alfred Etienne
By
Young, Emery & Thompson
Attys.

Oct. 26, 1954  A. ETIENNE  2,692,484
SEPARATION OF GASEOUS MIXTURES
Filed April 4, 1951  4 Sheets-Sheet 4

INVENTOR
ALFRED ETIENNE
By Young, Emery & Thompson
Attys.

Patented Oct. 26, 1954

2,692,484

UNITED STATES PATENT OFFICE 2,692,484

SEPARATION OF GASEOUS MIXTURES

Alfred Etienne, Paris, France, assignor to L'Air Liquide, Societe Anonyme pour l'Etude et l'Exploitation des Procedes Georges Claude, Paris, France Application April 4, 1951, Serial No. 219,151

Claims priority, application France April 24, 1950

2 Claims. (Cl. 62—175.5)

This invention is concerned with an improved process for the cold fractionation of gas mixtures, such as natural gases, coke oven gases, etc. This separation is usually carried out, in one or several columns, each of which is heated at its lower portion and cooled at its top. This heating and cooling are generally performed through heat exchanges either with the mixture to be separated or with the most volatile component, which issues from the upper portion, and is re-compressed for this purpose. It has also been suggested to use, for the indirect contact cooling of the top of the column, the less volatile component, in a liquid state after an expansion which lowers its temperature sufficiently.

It is known that difficulties arise in certain separations, as in the one of two very closely boiling constituents or of a rather low boiling product diluted in a much larger amount of a higher boiling other product.

It is the main object of the present invention to facilitate and to make more complete such uneasy separations, and to provide apparatus which are safe and convenient to run up.

These and other objects and advantages of this invention will become apparent from the following description.

According to the present invention, the higher boiling fraction resulting from the separation is expanded to a suitable pressure and used in a liquid state to cool in indirect contact the upper part of the column, being so vaporized. After a portion, which forms a final product of the separation, has been withdrawn outwardly, the remaining part is compressed and utilized for heating the bottom of the column, either by direct or indirect contact.

On the other hand, according to a modification of the invention, and while keeping the above indicated heating for the lower portion of the column, instead of directly cooling the top of the column by the heavier component, this cooling may be effected by means of an auxiliary fluid more volatile than said component (and which will be preferably the most volatile component in the mixture to be separated). This fluid, taken in its gaseous state, is compressed, then liquefied by a heat exchange with the heavy component. After expansion, it vaporizes while cooling the upper portion of the column. The heavy component, so heated by its exchange with the auxiliary fluid will be used, after re-compression, for heating the lower portion of the column, as mentioned hereabove.

The invention may be embodied in association with the one disclosed in U. S. Patent No. 2,534,903 of December 19, 1950, granted to the applicant. In this embodiment, the higher boiling fraction resulting from the separation is divided in two parts, the first of which is partially expanded, then vaporized in a condenser located in an intermediate region of the column, while partially condensing the gases rising in the column, and then withdrawn outwardly the second part being used as stated above to cool the upper portion of the column and then compressed to heat the bottom of the same. The liquid reflux of the top of the column is provided, according to the above mentioned patent, through a partial liquefaction of the gases under relatively high pressure issuing from the top of the column, which are expanded in two stages, with performance of external work, so cooled and used to cool and partly liquefy the gas under pressure.

The invention applies particularly to the case where the column has to be operated under a relatively high pressure, on account either of the chemical composition of the mixture to be separated or of its physical condition (case of certain natural gases gushing under a high pressure) or in case it is desired to separate a relatively volatile product, diluted to a low proportion in a less volatile component. This is the case, for instance, for a mixture consisting of 10% ethylene, boiling at —103° C., and ethane, boiling at —89° C., under atmospheric pressure.

The accompanying drawings show schematically some embodiments of the present invention.

Figure 1 relates to the treatment of an ethane-ethylene mixture, with the above mentioned proportions. It comprises the direct heating of the lower portion of the column by injection, in a gaseous condition, of the least volatile component in the mixture.

Figure 2 shows, according to a modification, the indirect heating of the base of the column by the heat released by the liquefaction, under pressure, of the less volatile component, the mixture to be separated being the same as in the case of Figure 1.

Figure 3 is an example of application to the fractionation of a natural gas gushing under a high pressure which example associates the present invention with the one disclosed in U. S. Patent 2,534,903 of the applicant.

Figure 1:
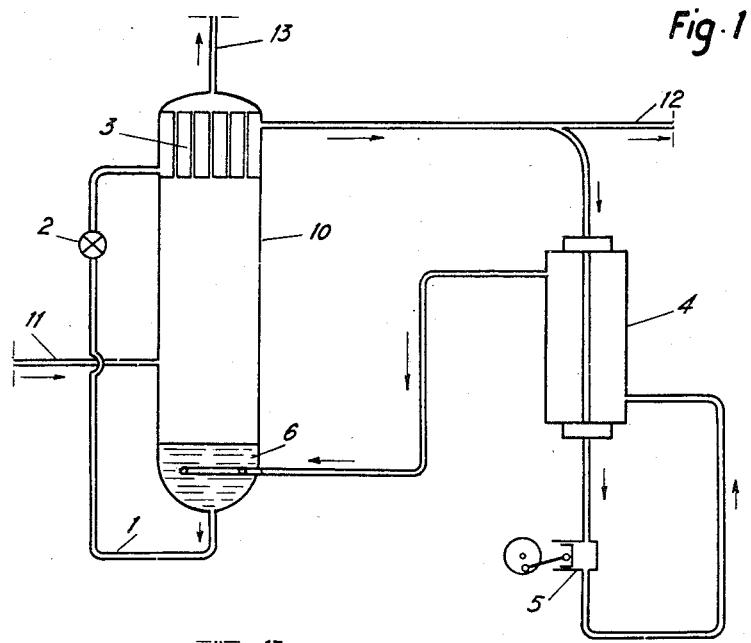

In Figure 1, the ethane-ethylene mixture, previously cooled to the neighbourhood of its liquefaction temperature by heat exchange with the separated products, enters, at 11, a rectification column 10. The less volatile component, that is ethane in the prevent instance, leaves the base of the column in a liquid condition through the pipe 1. It is expanded through the valve 2 to about the atmospheric pressure, and enters a condenser 3 in which it is vaporized in indirect contact with ethylene which it partly liquefies. Issuing from the condenser, a portion of the ethylene leaves the apparatus at 12, exchanges its cold with the mixture to be separated and is then collected. The remaining ethane goes through the exchanger 4, is compressed at 5 to the inside pressure of the column, is cooled in exchanger 4 by the gas going to the compressor and is injected at 6 into the column, so heating the same. The ethylene issues from the column top through pipe 13.

Figure 2:
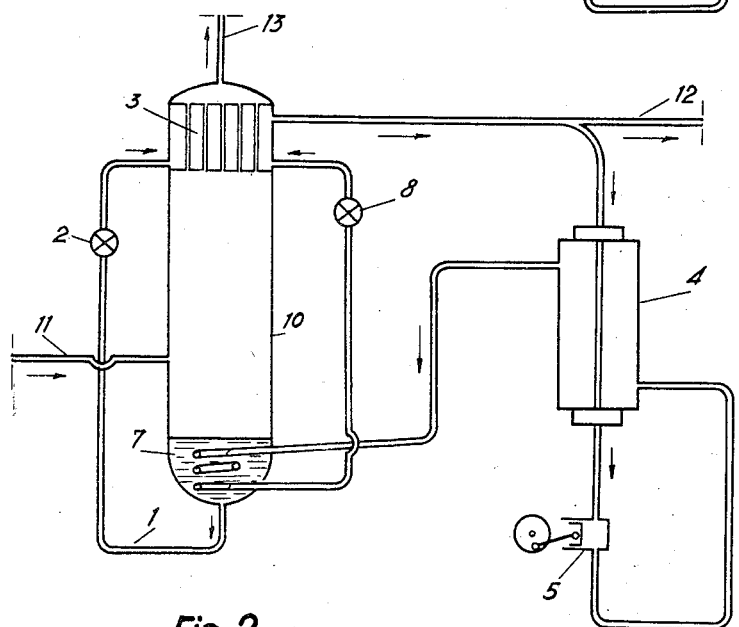

According to Figure 2, the base of the column is heated by means of a coil 7 in which the less volatile component in the mixture is liquefied after having been compressed at 5. It is then expanded at 8 and helps the cooling of condenser 3 in which it joins the fraction of the same component leaving the column, at its base, through pipe 1.

Figure 3:
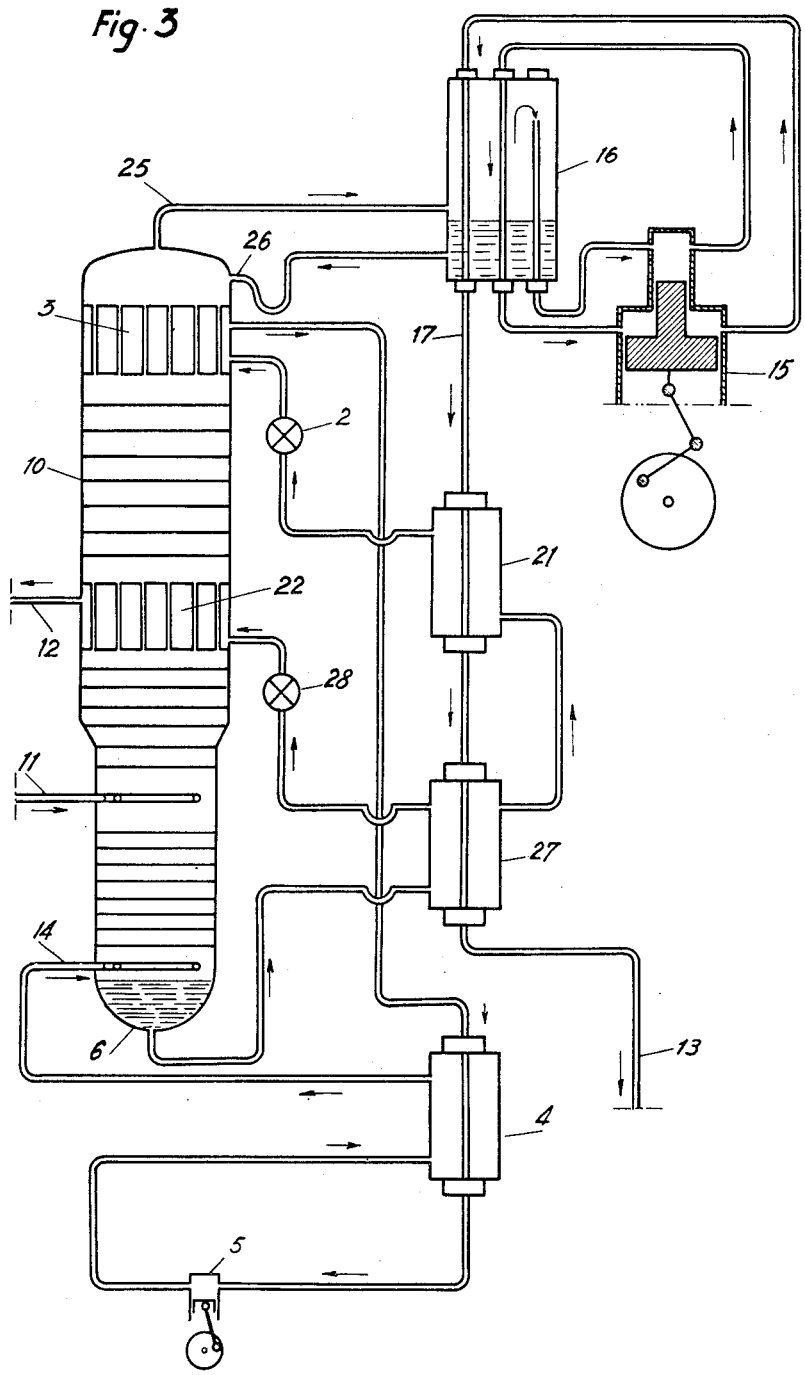

Figure 3 shows another application of the invention, for separating a mixture of nitrogen and methane, from a natural gas, the less volatile constituents of which have previously been eliminated by condensation, by heat exchange with the rectification products.

The mixture comprising about 15% of nitrogen and 85% of methane, previously cooled to the vicinity of its dew point under the inside pressure of the column, viz. 20 to 30 atm. enters at 11 the column 10, wherein it goes up, in counter current with the falling down reflux liquid. This condensation is effected at two different levels, through both condensers 22 and 3 in which the methane issuing at 6, in a liquid condition, from the base of the column, is vaporized at two different pressures, as 9 atm. at 22 and 4 atm. at 3. For this purpose, methane, after being cooled in exchanger 27, by heat exchange with nitrogen issuing from the top of the column, as stated hereafter, is separated into two fractions, one of which is expanded at 28 to a pressure of 9 atm. then cools condenser 22 and leaves the apparatus in a gaseous condition at 12 to be collected outside after it has given up its cold to the raw products to be separated, in exchangers not shown. The other fraction goes through exchanger 21, then is expanded at 2 to the pressure of 4 atm. cools condenser 3, wherefrom it issues in a gaseous state, then is compressed at 5 after a heat exchange at 4 with the still uncompressed gas. It then re-enters at 14 the column, to ensure the heating thereof.

Gaseous nitrogen escaping at 25 from the top of the column is expanded with external work in the double expander 15, in accordance with U. S. Patent No. 2,534,903 of December 19, 1950, of the applicant, for a "Process for separating by liquefaction gaseous mixtures into their components." The cold resulting from this expansion is used for partially liquefying nitrogen under pressure in exchanger 16. The liquefied portion returns to column 10 at 26 while the part which remained gaseous leaves the exchanger at 17, exchanges its cold with the incoming raw product and is then discharged at 13.

Figure 4:
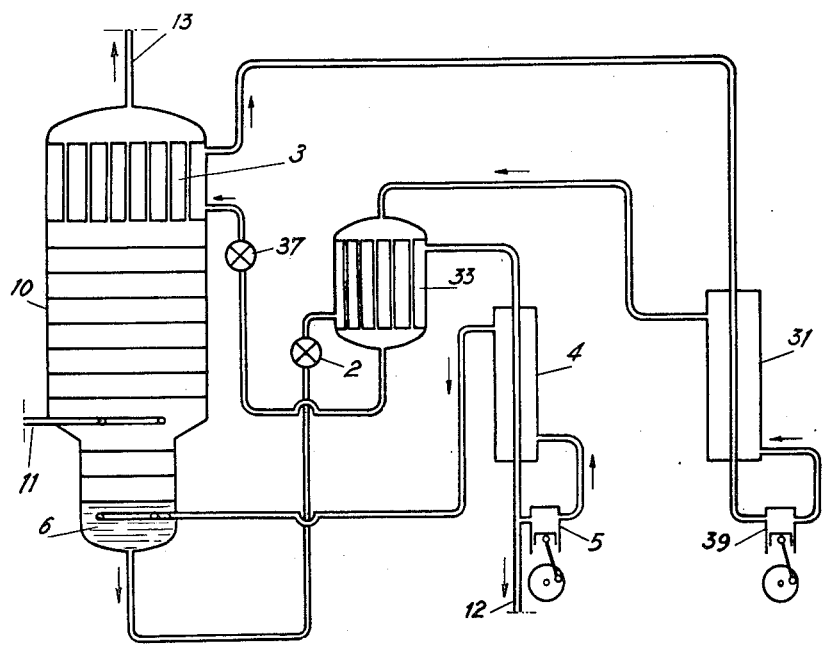
Figure 4 is an example of the use, for the cooling of the upper portion of the column, of an auxiliary fluid running through a cycle and cooled itself indirectly by the less volatile component.
Figure 5:
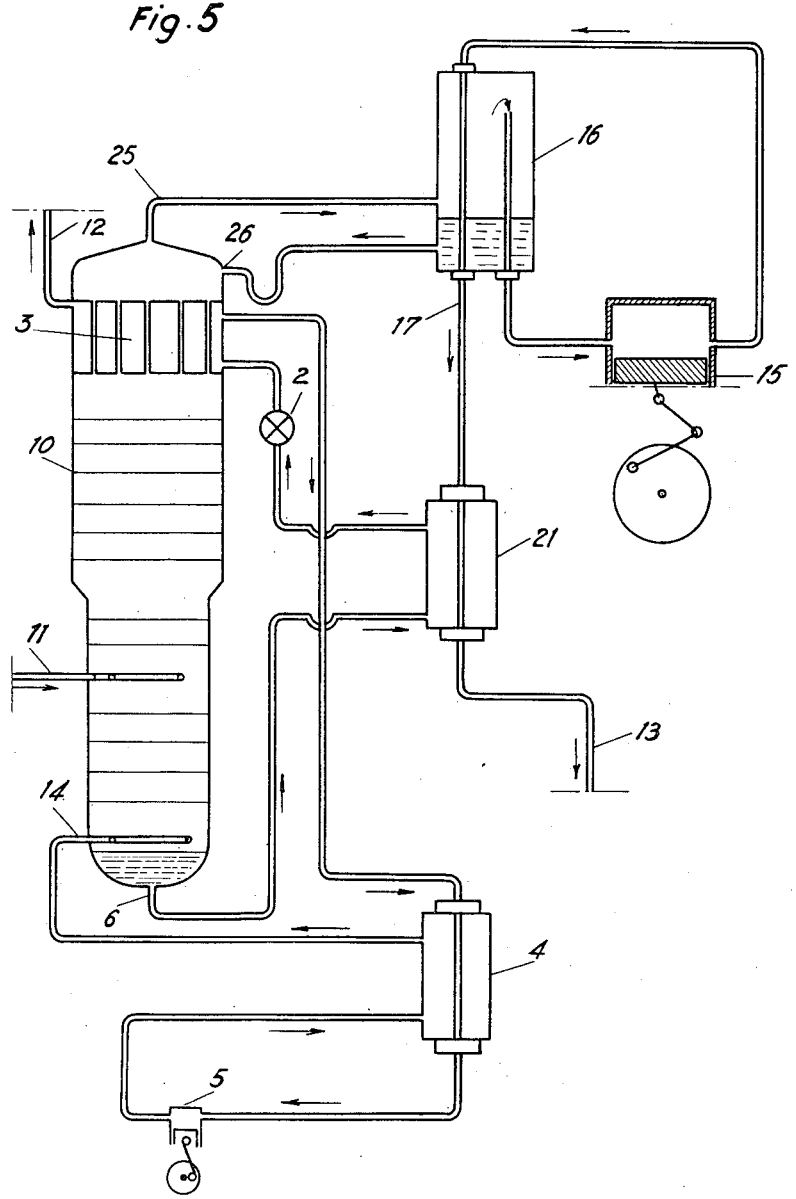
Figure 5 shows schematically another embodiment of the invention.

In Figure 4, the mixture to be separated, supposed to be made up of two components which will be termed as heavy and light components, enters column 10 at 11. The heavy component, issuing at the base is expanded at 2 and gives up its cold, in exchanger 33 to the auxiliary substance (the light component in the present case), which secures the cooling of the top of the column. The portion constituting the collected product is withdrawn at 12. The remaining part, as in examples illustrated in Figures 1 and 2, is recompressed at 5 with a heat exchange at 4, and then heats the base of the column at 6.

The light component, used as an auxiliary substance, liquefied under pressure in exchanger 33, is expanded at 37 and, by its vaporization, cools top condenser 3. It is then recompressed at 39 with a heat exchange at 21 with the still uncompressed gas, and returns to exchanger 33 wherein it is liquefied again. The portion of the light component rising inside the column and having not been liquefied in condenser 3 leaves the column in a gaseous condition at 13.

What I claim is:

1. Process for separating at a low temperature in a rectification column a gas mixture, substantially made up with a low boiling product diluted in a larger amount of a higher boiling other product, resulting in a lower boiling gaseous fraction and a higher boiling liquid fraction, which comprises dividing this higher boiling liquid fraction in two parts, the first of which is partially expanded, vaporized in indirect heat exchange with the gas while rising in an intermediate region of the column, and then withdrawn as final product, the second part being expanded and vaporized in indirect heat exchange with the gas rising in the upper part of the column, then compressed and used for heating the bottom of the column.

2. Process for separating at a low temperature in a rectification column a gas mixture, substantially made up with a low boiling product diluted in a larger amount of a higher boiling other product, resulting in a lower boiling gaseous fraction and a higher boiling liquid fraction, which comprises dividing this higher boiling liquid fraction in two parts, the first of which is partially expanded, vaporized in indirect heat exchange with the gas rising in an intermediate region of the column, and then withdrawn as final product, the second part being firstly used in its liquid state to heat in indirect contact the lower boiling gaseous fraction resulting from the separation, being then expanded and used to cool in indirect contact the upper part of the column, then compressed and used for heating the bottom of the column; besides, the gases issued from the top of the column are cooled and partly liquefied through heat exchange with the gaseous residue resulting from said partial liquefaction, which residue has been expanded with performance of external work; the resulting liquid is used as a reflux in the upper part of the rectification column; the gaseous residue which forms the lower boiling fraction resulting from the separation is then heated, as mentioned above, by the second part of the higher boiling fraction, then heated by the whole of this same fraction, and withdrawn as final product.

References Cited in the file of this patent

UNITED STATES PATENTS

| Number | Name | Date |
| --- | --- | --- |
| 1,939,696 | Hasche | Dec. 19, 1933 |
| 2,519,955 | Deming | Aug. 22, 1950 |
| 2,534,903 | Etienne | Dec. 19, 1950 |
| 2,600,110 | Hachmuth | June 10, 1952 |
| 2,619,814 | Kniel | Dec. 2, 1952 |